United States Patent
Wu et al.

(10) Patent No.: US 12,097,776 B2
(45) Date of Patent: Sep. 24, 2024

(54) ELECTRIFIED VEHICLE MOTOR CONTROL DURING TOW

(71) Applicant: FORD GLOBAL TECHNOLOGIES, LLC, Dearborn, MI (US)

(72) Inventors: Ji Wu, Ann Arbor, MI (US); Yang Xu, Canton, MI (US); Michael W. Degner, Novi, MI (US); Wei Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 95 days.

(21) Appl. No.: 17/963,629

(22) Filed: Oct. 11, 2022

(65) Prior Publication Data
US 2024/0116377 A1 Apr. 11, 2024

(51) Int. Cl.
*B60L 53/24* (2019.01)
*B60L 53/53* (2019.01)

(52) U.S. Cl.
CPC .............. *B60L 53/24* (2019.02); *B60L 53/53* (2019.02)

(58) Field of Classification Search
CPC .......... B60L 3/003; B60L 15/20; B60L 50/51; B60L 2240/421; B60L 15/04; B60L 2210/40; B60L 2240/527; B60L 2240/529; B60L 50/60; B60L 15/02; B60L 15/025; B60L 2220/42; B60L 2220/56; B60L 2240/429; B60L 3/0061; B60L 3/0084; B60L 53/24; B60L 2220/14; B60L 2220/12; B60L 2210/42; B60L 1/08; B60L 50/14; H02P 21/00; H02P 21/0003; H02P 21/0021; H02P 21/18; H02P 21/22; H02P 21/36; H02P 21/14; H02P 23/00; H02P 23/0027; H02P 23/14; H02P 23/07; H02P 25/022; H02P 3/12; H02P 3/22; H02P 29/024; H02P 27/04; H02P 27/06; H02P 27/08; H02P 6/08; H02P 25/22; H02P 3/18; H02K 11/33; H02K 16/00

See application file for complete search history.

(56) References Cited

U.S. PATENT DOCUMENTS

| | | | |
|---|---|---|---|
| 8,502,410 B2 | 8/2013 | Heller et al. | |
| 8,810,177 B2 | 8/2014 | Schulz | |
| 9,041,329 B2 | 5/2015 | Zhang et al. | |
| 2017/0264229 A1* | 9/2017 | Murata | H02P 3/22 |

FOREIGN PATENT DOCUMENTS

| | | |
|---|---|---|
| CN | 203020092 U | 6/2013 |
| CN | 111038261 A | 4/2020 |
| WO | 2022061102 A1 | 3/2022 |

* cited by examiner

*Primary Examiner* — Antony M Paul
(74) *Attorney, Agent, or Firm* — Brooks Kushman P.C.

(57) ABSTRACT

An electric drive system is actively controlled while an electrified vehicle is being towed. The inverter switches are manipulated to preclude exceeding a maximum voltage of a DC bus and also to preclude exceeding a maximum phase current magnitude. During a transition from an inverter off state to a short-circuit state, field-oriented control is utilized.

16 Claims, 5 Drawing Sheets

ELECTRIFIED VEHICLE MOTOR CONTROL DURING TOW

TECHNICAL FIELD

The present invention relates to control of an inverter for an electrified vehicle.

BACKGROUND

An electrified vehicle includes an electric drive system either in addition to or instead of an internal combustion engine. The electric drive system includes a motor and an inverter which converts DC power to AC power delivered to motor windings to generate a desired motor torque. In normal operation, the vehicle is propelled by either the motor or an on-board internal combustion engine. However, the vehicle may occasionally be towed by another vehicle. For example, the vehicle may be towed behind a motorhome or a tow truck.

SUMMARY

An electric drive system includes a motor, an inverter, and a controller. The motor has stator circuits. The inverter is electrically connected to the stator circuits. A DC bus may be electrically connected to the inverter. A capacitor may be electrically connected in parallel with the inverter. A battery and a contactor may be electrically connected in series with one another and in parallel with the inverter. The controller is programmed to initiate field-oriented control in response to a speed of a rotor of the electric motor exceeding a speed threshold. Using field-oriented control, the controller adjusts a current, $I_d$, in the stator circuits, as measured with respect to a rotor reference frame, toward a short-circuit current value. In response to the current reaching the short-circuit current value, the controller commands the inverter to a short-circuit state. The short-circuit state may be commanded, for example, by closing either the lower row of switches or the upper row of switches of the inverter. The controller may also command the inverter to the short-circuit state in response to a voltage of the DC bus exceeding a voltage threshold. The step described above may be performed in response to the contactor being open. The contactor being open may be detected by the voltage of the DC bus being less than a predefined voltage threshold and increasing as the speed of the rotor increases at a predefined ratio to the speed of the rotor. The electric drive system may be part of an electrified vehicle in which the An inverter control method includes transitions from a switches-off state to field-oriented control, adjusting stator currents, and then transitioning to a short-circuit state. The transition to field-oriented control is performed in response to a DC bus voltage exceeding a voltage threshold. The stator currents, as measured with respect to a rotor reference frame, are adjusted toward a short-circuit current value. The transition to the short-circuit state is performed in response to the current reaching the short-circuit current value. The transition to the short-circuit state may also be performed in response to the DC bus voltage exceeding a voltage threshold, command the inverter to the short-circuit state. A battery and contactor may be electrically connected in series with one another and in parallel with the inverter. The steps described above may be performed in response to the contactor being open. The contactor being open may be detected by the DC bus voltage being less than a predefined voltage threshold and increasing as the speed of the rotor increases at a predefined ratio to the speed of the rotor.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
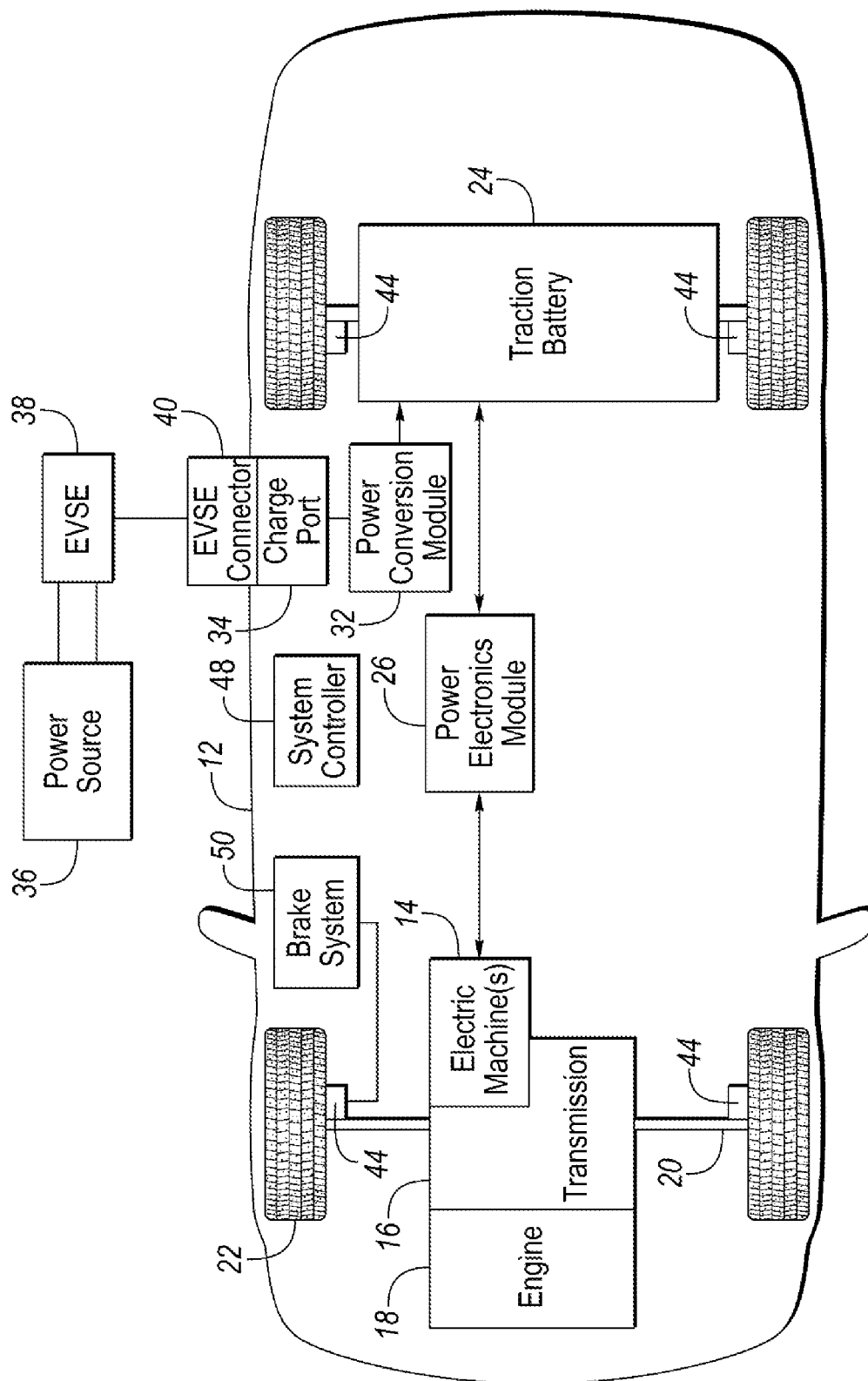
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) voltage to function. Power electronics module 26 may convert the DC voltage to a three-phase AC voltage to operate electric machine 14. In a regenerative mode, power electronics module 26 may convert three-phase AC voltage from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
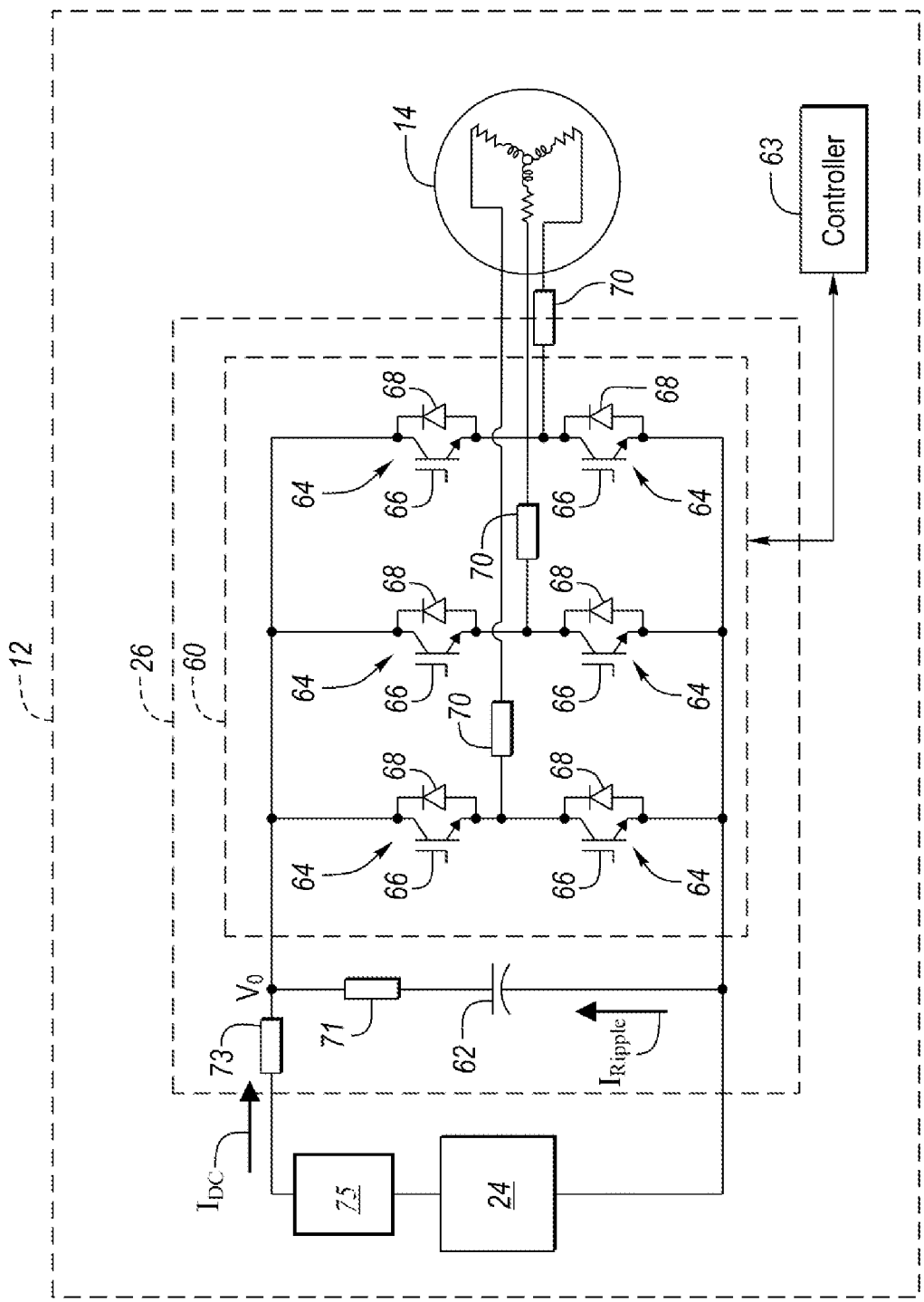
FIG. 2 illustrates a schematic diagram of components of an electric drive system of the electric vehicle, the components of the electric drive system including a traction battery, a power electronics module having a DC-link capacitor and an inverter, and a motor.

Referring now to FIG. 2, with continual reference to FIG. 1, a schematic diagram of components of an electric drive system of EV 12 is shown. As shown in FIG. 2, the electric drive system of EV 12 includes traction battery 24, power electronics module 26, and electric machine (i.e., "motor") 14.

As described above, power electronics module 26 is coupled between battery 24 and motor 14. Power electronics module 26 converts DC electrical power provided from battery 24 into AC electrical power for providing to motor 14. In this way, power electronics module 26 drives motor 14 with power from battery 24 for the motor to propel EV 12.

Power electronics module 26 includes a DC-link capacitor 62 and an inverter 60 (or "inverter control system" ("ICS")). Inverter 60 shown in FIG. 2 is an exemplary inverter. DC-link capacitor 62 is disposed between battery 24 and inverter 60 and is connected in parallel with battery 24. DC-link capacitor 62 is operable to absorb ripple currents generated by operation of power switches of inverter 60 and stabilize a DC-link voltage Vo for inverter 60 control.

As known to those of ordinary skill, inverters convert DC power to multi-phase AC power (three-phase being most common). Inverters can move electrical power in either direction (bi-directional) either driving an electric machine (i.e., motoring) or electrically braking the electric machine (i.e., generating). An inverter system is made up of a combination of power electronic hardware (switches) and control software (FIG. 2 is a representative drawing). Electrical current can be quickly adjusted by opening and closing the power switches in the inverter.

Many inverter systems, including inverters relevant to embodiments of the present invention such as inverter 60, perform closed loop current control to precisely control the e-machine. To achieve this, the electric current in each phase of the inverter is sensed with a current sensor and a corresponding signal is provided to the controller of the inverter system. The most common approach is to sense all of the phases, but any one phase current can be inferred from knowledge of the other phase currents. The current sensor can use and/or be implemented in different technologies and current sensors 70 shown in FIG. 2, discussed below, are but one example. Such current sensors are typically integrated into the inverter.

Inverter 60 includes inverting circuitry and a plurality of power switching units 64. As known to those of ordinary skill, in the exemplary example, inverter 60 includes three sets of pairs of power switching units 64 (i.e., three×two=a total of six power switching units 64 as shown in FIG. 2). Each pair of power switching units 64 includes two power switching units 64 connected in series. Each power switching unit 64 includes a power switch 66, in the form a transistor, arranged anti-parallel with a diode 68. In this example, the transistor is an insulated gate bipolar transistor (IGBT). Each pair of power switching units 64 is connected in parallel with battery 24 and DC-link capacitor 62 and thereby each pair of power switching units forms a "phase" of inverter 60. In this way, inverter 60, having three pairs of power switching units 64, is a three-phase inverter operable for converting DC electrical power from battery 24 into three-phase AC electrical power for provision to motor 14.

Further, each phase of inverter 60 includes a current sensor 70. For instance, each current sensor 70 is a resistive shunt connected in series with the output of the corresponding phase. Current sensors 70 are operable for sensing the electrical current (IAC) outputted from the corresponding phases of inverter 60 to motor 14.

Further, a current sensor 71 is associated with DC-link capacitor 62. For instance, current sensor 71 is a resistive shunt connected in series with DC-link capacitor 62. Current sensor 71 is operable for sensing an electrical ripple current ($I_{Ripple}$) of DC-link capacitor 62. Alternatively, the electrical ripple current ($I_{Ripple}$) of DC-link capacitor 62 is calculated based on various operating parameters.

Further, a current sensor 73 is associated with the input of inverter 60. For instance, current sensor 73 is a resistive shunt connected in series with the input of inverter 60 (i.e., extending towards inverter 60 from the node at which traction battery 24, DC-link capacitor 62, and inverter 60 are connected). Current sensor 73 is operable for sensing an electrical input DC current ($I_{DC}$) drawn by inverter 60.

Power electronics module 26 has an associated controller 63. Controller 63 can be a microprocessor-based device. Controller 63 is configured to monitor operation of DC-link capacitor 62 and to monitor and control operation of inverter 60. Particularly, controller 63 is operable to control the operation of power switches 66 to cause inverter 60 to convert a given DC electrical power provided from battery 24 via DC-link capacitor 62 into a desired AC electrical power for providing to motor 14. Controller 63 is in communication with current sensors 70 to monitor the AC electrical power provided from inverter 60 to motor 14. Controller 63 uses information of current sensors 70 as feedback in controlling inverter 60 to output the desired AC electrical power to motor 14.

A Contactor 75 is an electronically controlled switch used to disconnect the battery 24 from the power electronics module 26 when the vehicle is not in use. For example, contactor 75 may be opened when a driver leaves the vehicle and closed when a driver indicates readiness for driving. (These conditions may be referred to as "key off" and "key on" even though some vehicles no longer utilize physical keys to indicate the presence of an authorized driver.)

Figure 3:
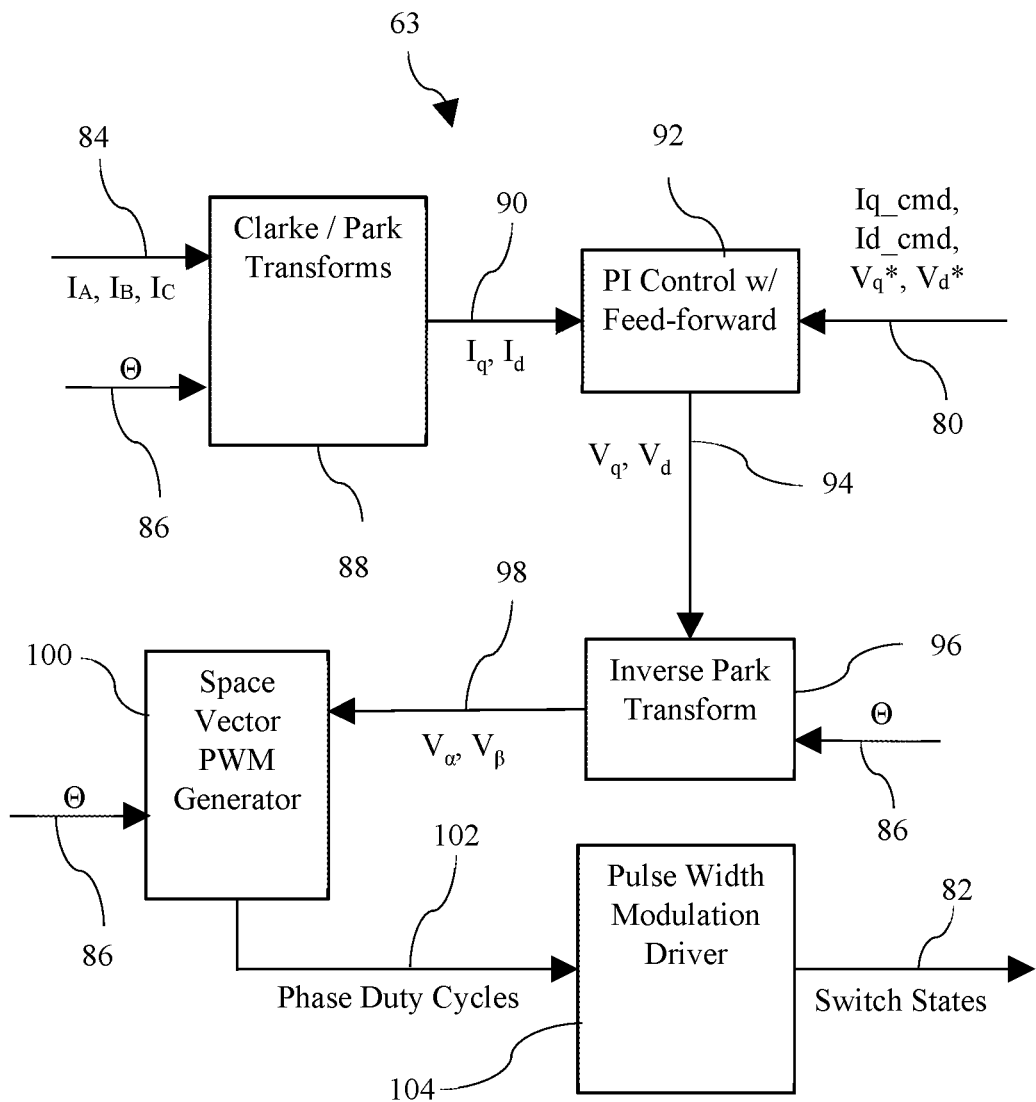
FIG. 3 illustrates field-oriented control of the inverter to achieve desired motor torque.

FIG. 3 illustrates logic that may be implemented in controller 63. The input 80 to controller 63 may include current and voltage phasors in a rotating reference frame.

These values tend to change gradually in response to changes in torque demand and vehicle speed and may be provided by another controller such a vehicle system controller 48. Specifically, Iq_cmd and Id_cmd represent the quadrature and direct components of a commanded current phasor. The quadrature component and direct component are perpendicular and parallel, respectively, to the motor's permanent magnetic field. $V_q^*$ and $V_d^*$ represent a commanded voltage phasor. The output 82 of controller 63 may be switch states for the six power switches 66 of inverter 60. These binary values change very frequently.

The control logic of FIG. 3 implements closed loop control based on the current phasor command represented by Iq_cmd and Id_cmd. $V_q^*$ and $V_d^*$ are utilized as feed-forward terms. The measured phase currents 84 are provided by current sensors 70. The rotor position 86 is provided by a resolver (not shown). The phase currents are translated into the rotor reference frame using Clarke and Park transforms at 88. $I_q$ and $I_d$ are quadrature and direct components of the measured phase current 90. Block 92 determines the voltage in the rotating reference frame 94. Specifically, the quadrature component, $V_q$, is calculated using a term that is proportional to the difference between Iq_cmd and $I_q$, a term that is proportional to an integral of that difference, and feed-forward term $V_q^*$. The direct component $V_d$ is calculated analogously. By setting the coefficients for these terms, it is possible to convert to open loop voltage control if desired.

Block 86 converts the voltage phasor in the rotating reference frame into voltage components 98 in a fixed reference frame. Space vector modulation is used at 100 to determine duty cycles 102 for each of the power switches 66 that will establish the desired voltage. Finally, a pulse width modulation driver 104 rapidly turns the switches on and off according to the specified duty cycles.

When vehicle 12 is towed with drive wheels on the ground, such as being towed behind a motorhome or a tow truck, the rotor of electric machine 14 rotates at a speed proportional to vehicle speed. In this condition, contactor 75 may be open such that battery 24 is disconnected from power electronics module 26. The permanent magnets of the rotor induce AC voltage across the three stator terminals with a magnitude that is proportional to vehicle speed. Unless controller 63 actively controls switches 66, the default state for these switches is to be off (open). With all switches off and contactor 75 open, current may flow through the diodes 68 and create a DC voltage across capacitor 62. At low vehicle speed, the voltage across capacitor 62 is not problematic. However, at high vehicle speeds, the voltage may exceed the maximum design voltage of capacitor 62 or other components connected to the DC bus.

One way to limit the voltage across the capacitor 62 is to actively close either the top row of switches 66 or the bottom row of switches 66. This connects the three motor terminals to one another (i.e. short circuited). The inverter state in which either the top row of switches or the bottom row of switches are closed is called a short-circuit state. Once a steady state is reached, the direct current $I_d$ reaches a level strong enough to cancel the permanent magnetic field of the rotor and the quadrature current $I_q$ goes to near zero. The $I_d$ and $I_q$ values in the short-circuit state, called short-circuit current values, are dictated by rotor speed and physical properties of the motor. The DC voltage across capacitor 62 remains at whatever level it had reached before the transition to the short-circuit state. If the vehicle speed does not exceed an approved towing speed, the phase currents in this steady state condition are within the design specifications of the motor. However, there is a transient period before this steady state is reached in which the phase currents may exceed the design specifications. Therefore, it is desirable to manage this transition.

Figure 4:
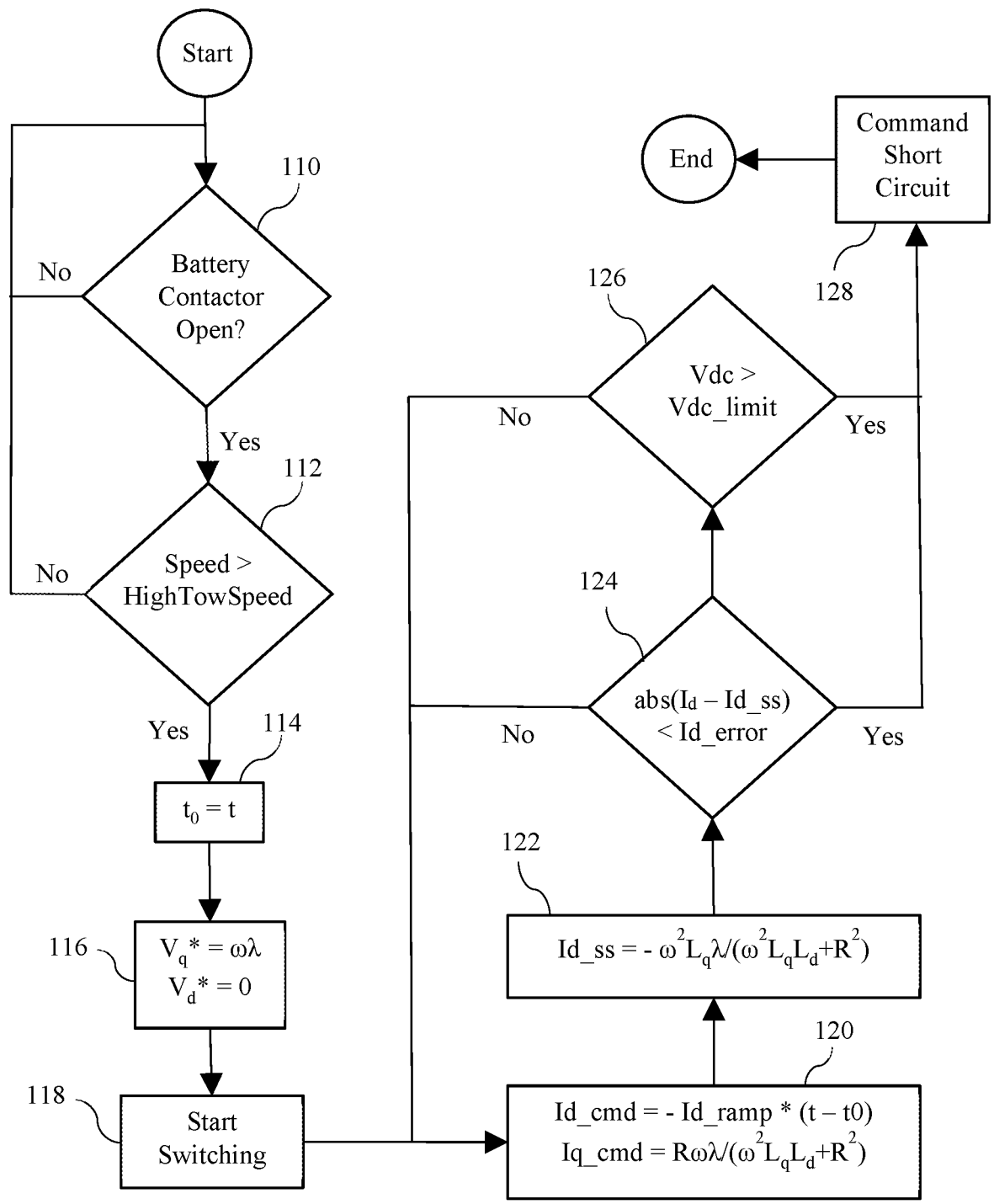
FIG. 4 is a flow chart for a control method used while an electrified vehicle is being towed by another vehicle.

FIG. 4 illustrates a process for recognizing a high-speed towing condition and managing a transition to a short-circuit state while preventing excessive phase currents. At 110, controller 63 determines whether the battery contactor is currently open. This information may be determined using a software flag that is set when the contactor is opened or closed. As discussed below, the status of the contactor may also be determined by observing rotor speed and bus voltage. At 112, the controller determines whether the speed exceeds a predetermined threshold, HighTowSpeed. Since vehicle speed and rotor speed are proportional, this determination may be made by measuring either vehicle speed or rotor speed. Also, since the DC bus voltage is proportional to rotor speed in this condition, the determination may be based on DC bus voltage. These various mechanisms of detecting the condition of 112 should be regarded as equivalent.

If the conditions of 110 and 112 are both satisfied, then the controller initiates a transition process using field-oriented control at 114 through 118. At 114, the beginning time of the transition is recorded. At 116, the feed-forward terms are set. At 118, active control of the switches begins. During the transition process, the open-loop current commands are set at 120. Iq_cmd is set to the quadrature steady-state current value. Id_cmd is ramped down from zero at a pre-defined ramp rate Id_ramp. In some embodiments, the initial value may be something other than zero. At 122, the controller calculates the direct steady-state current value Id_ss. (Note that R is generally small relative to other terms in this equation such that Id_ss may not vary significantly with rotor speed. Therefore, it may be acceptable to treat Id_ss as a predefined constant.) The transition process normally terminates when the measured $I_d$ is within a threshold Id_error of the direct steady-state current value Id_ss at 124. If the DC bus voltage Vdc exceeds a predefined threshold Vdc_limit at 126, then the transition process terminates early. Once either termination condition 124 or 126 has been reached, the controller commands the switches to one of the short-circuit states at 128.

During the transition process, the magnitudes of the stator currents gradually increase toward their respective steady state levels for the short-circuit state. When the short-circuit state is entered after this transition process, the stator currents continue at these magnitudes. The transient behavior associated with a sudden transition to the short-circuit state is not encountered.

Figure 5:
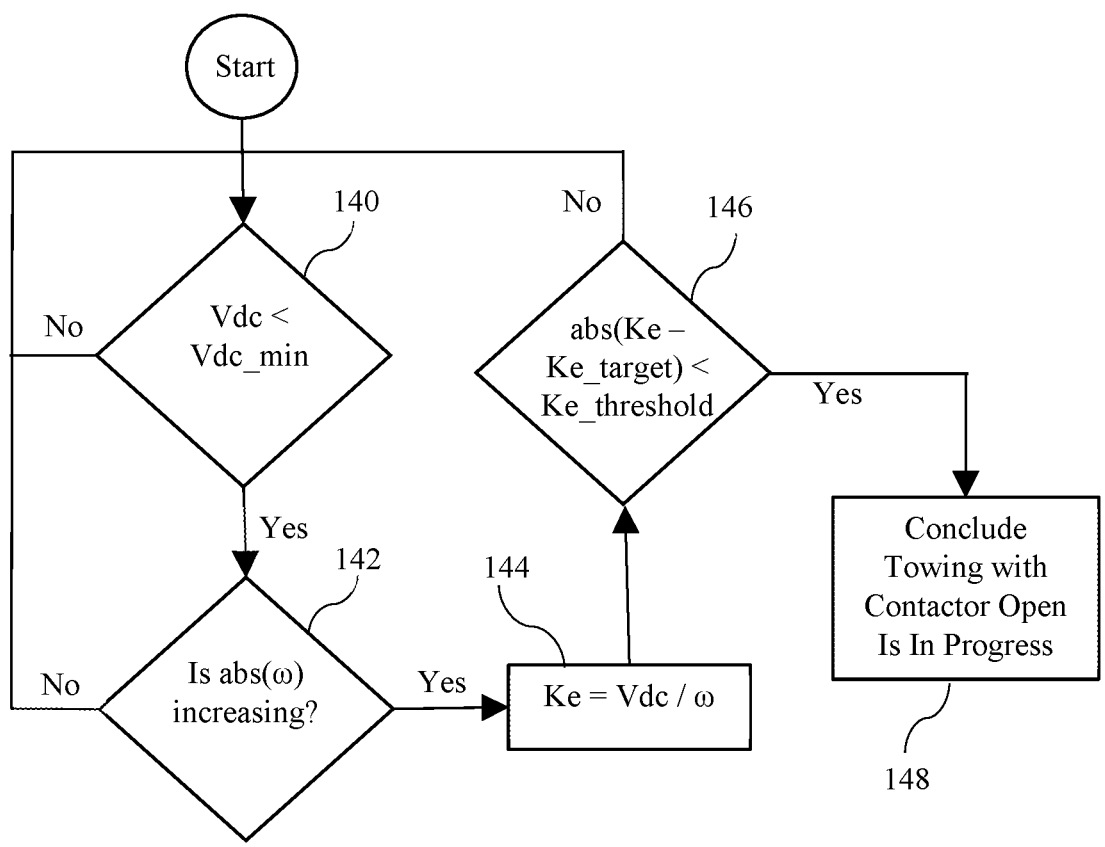
FIG. 5 is a flow chart for a method of detecting that an electrified vehicle is being towed by another vehicle.

In some implementations, controller 63 may not have direct information about the contactor status at 110. FIG. 5 illustrates a process for determining the contactor status. When the vehicle is being towed with the contactor open and the without inverter switching, the DC bus voltage increases in proportion to vehicle speed as the vehicle speed increases. At 140, the control checks whether the DC bus voltage is less than a predefined minimum battery voltage Vdc_min. At 142, the controller checks whether the motor speed is increasing (either forward or backwards). At 144, the controller calculates the ratio Ke of the bus voltage and the speed. At 146, this ratio is compared to the expected ratio during a towing condition Ke_target. If these values are within a threshold Ke_threshold, then the control concludes at 128 that towing with the contactor open is in progress.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric drive system, comprising:
a motor having stator circuits;
an inverter electrically connected to the stator circuits; and
a controller programmed to:
initiate field-oriented control in response to a speed of a rotor of the motor exceeding a speed threshold;
adjust a current in the stator circuits, as measured with respect to a rotor reference frame, toward a short-circuit current value; and
in response to the current reaching the short-circuit current value, command the inverter to a short-circuit state wherein terminals of the stator circuits are electrically connected to one another.

2. The electric drive system of claim 1, further comprising:
a DC bus electrically connected to the inverter; and
a capacitor electrically connected in parallel with the inverter.

3. The electric drive system of claim 2 wherein the controller is further programmed to, in response to a voltage of the DC bus exceeding a voltage threshold, command the inverter to the short-circuit state.

4. The electric drive system of claim 2, further comprising:
a battery; and
a contactor, wherein the battery and contactor are electrically connected in series with one another and in parallel with the inverter.

5. The electric drive system of claim 4, wherein the initiate, adjust, and command steps are performed in response to the contactor being open.

6. The electric drive system of claim 2, wherein the initiate, adjust, and command steps are performed in response to a voltage of the DC bus being less than a predefined voltage threshold and increasing as the speed of the rotor increases at a predefined ratio to the speed of the rotor.

7. An inverter control method comprising:
transitioning from a switches-off state to field-oriented control in response to a DC bus voltage exceeding a voltage threshold;
adjusting stator currents, as measured with respect to a rotor reference frame, toward a short-circuit current value; and
in response to the stator currents reaching the short-circuit current value, transitioning to a short-circuit state.

8. The inverter control method of claim 7 wherein the controller is further programmed to, in response to the DC bus voltage exceeding a voltage threshold, command the inverter to the short-circuit state.

9. The inverter control method of claim 7, wherein a battery and contactor are electrically connected in series with one another and in parallel with the inverter and wherein the initiate, adjust, and command steps are performed in response to the contactor being open.

10. The inverter control method of claim 7, wherein the initiate, adjust, and command steps are performed in response to the DC bus voltage being less than a predefined voltage threshold and increasing as the speed of the rotor increases at a predefined ratio to the speed of the rotor.

11. An electrified vehicle, comprising:
a motor having a rotor drivably connected to vehicle wheels and having stator circuits;
an inverter electrically connected to the stator circuits; and
a controller programmed to:
initiate field-oriented control in response to the vehicle being towed at a vehicle speed exceeding a speed threshold;
adjust a current in the stator circuits, as measured with respect to a rotor reference frame, toward a short-circuit current value; and
in response to the current reaching the short-circuit current value, command the inverter to a short-circuit state.

12. The electrified vehicle of claim 11, further comprising:
a DC bus electrically connected to the inverter; and
a capacitor electrically connected in parallel with the inverter.

13. The electrified vehicle of claim 12 wherein the controller is further programmed to, in response to a voltage of the DC bus exceeding a voltage threshold, command the inverter to the short-circuit state.

14. The electrified vehicle of claim 12, further comprising:
a battery; and
a contactor, wherein the battery and contactor are electrically connected in series with one another and in parallel with the inverter.

15. The electrified vehicle of claim 14, wherein the initiate, adjust, and command steps are performed in response to the contactor being open.

16. The electrified vehicle of claim 12, wherein the initiate, adjust, and command steps are performed in response to a voltage of the DC bus being less than a predefined voltage threshold and increasing as a speed of the rotor increases at a predefined ratio to the speed of the rotor.

* * * * *